(12) United States Patent
Dalsgaard et al.

(10) Patent No.: US 8,032,157 B2
(45) Date of Patent: Oct. 4, 2011

(54) APPARATUS, METHOD AND COMPUTER PROGRAM PRODUCT PROVIDING INCLUSION OF LOCAL AREA INFORMATION IN BROADCAST MESSAGES AND MAINTENANCE OF RADIO ACCESS NETWORK BLACK LIST

(75) Inventors: Lars Dalsgaard, Oulu (FI); Whui Mei Yeo, Lund (SE); Harri Jokinen, Pertteli (FI); Hannu Hietalahti, Kiviniemi (FI)

(73) Assignee: Nokia Corporation, Espoo (FI)

( * ) Notice: Subject to any disclaimer, the term of this patent is extended or adjusted under 35 U.S.C. 154(b) by 1121 days.

(21) Appl. No.: 11/505,230

(22) Filed: Aug. 15, 2006

(65) Prior Publication Data
US 2007/0037577 A1 Feb. 15, 2007

Related U.S. Application Data

(60) Provisional application No. 60/708,808, filed on Aug. 15, 2005.

(51) Int. Cl.
*H04W 24/00* (2009.01)

(52) U.S. Cl. ............ 455/456.4; 455/405; 455/429; 455/447; 455/440; 455/562.1; 370/333; 714/721; 714/711

(58) Field of Classification Search .......... 455/405, 455/429, 447, 446, 434, 440, 562, 456.4; 370/333; 714/721, 711; 380/34; 365/230, 365/149
See application file for complete search history.

(56) References Cited

U.S. PATENT DOCUMENTS

| | | | | |
|---|---|---|---|---|
| 6,421,328 B1 * | 7/2002 | Larribeau et al. | ............ | 370/329 |
| 6,501,951 B2 * | 12/2002 | Moore | ............ | 455/434 |
| 7,548,752 B2 * | 6/2009 | Sampath et al. | ............ | 455/447 |
| 2001/0011019 A1 * | 8/2001 | Jokimies | ............ | 455/449 |
| 2002/0111166 A1 * | 8/2002 | Monroe | ............ | 455/435 |
| 2002/0123348 A1 * | 9/2002 | Willars et al. | ............ | 455/436 |
| 2002/0197992 A1 * | 12/2002 | Nizri et al. | ............ | 455/435 |
| 2003/0040313 A1 * | 2/2003 | Hogan et al. | ............ | 455/435 |
| 2003/0040314 A1 * | 2/2003 | Hogan et al. | ............ | 455/435 |
| 2004/0082328 A1 * | 4/2004 | Japenga et al. | ............ | 455/436 |
| 2004/0192313 A1 | 9/2004 | Otting | ............ | 455/446 |
| 2005/0079870 A1 * | 4/2005 | Rick et al. | ............ | 455/437 |
| 2005/0090278 A1 * | 4/2005 | Jeong et al. | ............ | 455/525 |

(Continued)

FOREIGN PATENT DOCUMENTS

| EP | 0998159 A1 | 5/2000 |
|---|---|---|
| EP | 1 286 561 A1 | 2/2003 |
| JP | 2001095031 A | 4/2001 |

OTHER PUBLICATIONS

3GPP, 3$^{rd}$ Generation Partnership Project; Universal Mobile Telecommunications System, Mobile Radio Interface Layer 3 Specification, Core Network Protocols—Stage 3, TS 24.008 V3.1.0. (Oct. 1999).

(Continued)

*Primary Examiner* — Nick Corsaro
*Assistant Examiner* — Mahendra Patel
(74) *Attorney, Agent, or Firm* — Harrington & Smith

(57) ABSTRACT

A method includes receiving location area-related information, associating the location area-related information with a neighbor cell information to determine if a cell belongs to a forbidden location area, and avoiding selection of the cell if the cell is determined to belong to the forbidden location area. Embodiments described include a UE, network element, computer program product, and integrated circuit.

29 Claims, 6 Drawing Sheets

U.S. PATENT DOCUMENTS

| | | | |
|---|---|---|---|
| 2005/0096062 A1* | 5/2005 | Ji et al. | 455/450 |
| 2005/0288016 A1* | 12/2005 | Kuchibhotla et al. | 455/435.2 |
| 2006/0062175 A1* | 3/2006 | Ling et al. | 370/328 |
| 2006/0084443 A1* | 4/2006 | Yeo et al. | 455/449 |
| 2007/0004404 A1* | 1/2007 | Buckley et al. | 455/434 |
| 2008/0233959 A1* | 9/2008 | Klatt | 455/436 |

OTHER PUBLICATIONS

3GPP TSG GERAN, Meeting No. 29, San Jose Del Cabo, Mexico, Apr. 24-28, 2006, (45.008 CR-00306, Version 6.15.0) Change Request, "Performance Enhancement for Cell Reselection With Partial Roaming Restrictions on the Target Rat (UTRAN)".

3GPP, $3^{rd}$ Generation Partnership Project, Technical Specification Group Radio Access Network; UE Procedures in Idle Mode and Procedures for Cell Reselection in connected Mode (Release 4), TS 24.304 V4.5.0 (Jun. 2002).

3GPP, $3^{rd}$ Generation Partnership Project (3GPP); Technical Specification Group (TSG) RAN; Working Group 2 (WG2); RRC Protocol Specification, TS 25.331 V3.0.0 (Oct. 1999).

Yi-Bing Lin, Pei-Chun Lee and Imrich Chalamatac, "Dynamic Periodic Location Area Update in Mobile Networks," IEEE Transactions on Vehicular Technology, vol. 51, No. 6 Published Nov. 30, 2002.

* cited by examiner

US 8,032,157 B2

APPARATUS, METHOD AND COMPUTER PROGRAM PRODUCT PROVIDING INCLUSION OF LOCAL AREA INFORMATION IN BROADCAST MESSAGES AND MAINTENANCE OF RADIO ACCESS NETWORK BLACK LIST

CROSS REFERENCE TO RELATED APPLICATION

This Application claims the benefit under 35 USC 119 of U.S. Provisional Patent Application No. 60/708,808 filed on Aug. 15, 2005.

TECHNICAL FIELD

The exemplary and non-limiting embodiments of this invention relate generally to wireless communication devices, methods, computer program products and systems and, more specifically, relate to wireless communication systems that permit roaming.

BACKGROUND

The following abbreviations are defined as follows:

| | |
|---|---|
| 2G | Second generation mobile system, such as GSM |
| 3G | Third generation mobile system, such as UTRAN |
| CCCH | Common Control Channel |
| CN | Core Network |
| CS domain | Circuit Switched domain, typically normal call traffic |
| GSM | Groupe Special Mobile, global mobile communication system |
| LA | Location Area |
| LAI | Location Area Identity, PLMN identifier + LA identifier |
| LR | Location Registration, CS location update/PS routing area update, or combined |
| PBCCH | Packet Broadcast Common Channel |
| PCCCH | Packet Common Control Channel |
| PLMN | Public Land Mobile Network |
| PSI3-series | Packet System Information Type 3 |
| PS domain | Packet Switched domain, connectionless traffic |
| RAN | Radio Access Network |
| RAT | Radio Access Technology |
| SI | System Information |
| UE | User Equipment, (e.g., mobile terminal or mobile station) |
| UTRAN | Universal Terrestrial Radio Access Network |
| WCDMA | Wideband Code Division Multiple Access |

A problem can arise when a 3G network operator, who does not control a 2G network, has established a national roaming agreement to provide service for network subscribers outside the coverage of the network operator's 3G coverage. The roaming partner may also provide 3G service. The 3G service, though, may not be available for national roaming. Similarly a dual mode network operator may allow international roaming only on the 2G network. Another similar case can occur when only specific home network customers have access to the 3G network. Roaming subscribers (generally those who do not have permission to use 3G service) should not use the 3G service when there are 3G cells within a location area. On the other hand, as 3G neighbor cells are broadcast on the 2G network, the roaming subscriber will also receive this information and use it as defined. This means that roaming subscribers may possibly reselect to the 3G cells. The network operator may assure that the roaming subscriber does not obtain 3G service by concentrating the 3G cells in location area(s) which are different from the 2G location area(s), and then by rejecting a location update request into a 3G location area for those subscribers who are not permitted to use 3G cells (with an appropriate cause value). The subscriber is then forced to leave the 3G cell, but stay in the same network when the reject cause is, for example, one specified as #15 ("no suitable cells in this location area").

A similar (non-roaming) scenario may also occur in the user's 2G- and 3G-capable home network when the user, by subscription, is allowed to operate only in the 2G portion of the home network and not in 3G portion of the home network In general, this means that if an attempted LR procedure ends in rejection by the network, then the behavior of the UE is governed by the cause value that the network included in the message indicating rejection of the request. In some cases the reject cause values are meaningful across all cells in the same Location Area (LA). As an example, cause value #15 ("no suitable cells in this location area") denies access for the UE to all cells in the same LA. The location area reject forces the UE to add the location area to the list of forbidden location areas that are not accessible by the UE for a certain amount of time (such as 12 hours).

A future cell re-selection procedure will then exclude all cells of the serving Public Land Mobile Network (PLMN) that indicate the same LA, so in practice the UE is commanded by the network to search a cell of another LA in the same PLMN.

One problem with the current approach is that when the UE has re-selected back to a GSM cell, the only knowledge it has concerning WCDMA neighbor cells, based on the system information messages, is the radio frequency and scrambling code. In addition, the 2G to 3G reselection follows a principle that the suitability criteria of the target cell need not be checked before the reselection attempt is initiated. In some cases this is not possible without compromising the operation at the serving cell.

This means that the UE may, after a short time, try reselection to the same or another 3G cell. The outcome from this reselection would be a failure, as the location area is listed on the list of forbidden location areas. This though is not known unless the UE reselects to the cell or reads the 3G cell location area information (e.g. prior to the cell change). This approach is time consuming, increases power consumption and, in a worst case, the user may experience an inferior connection, as a service interrupt is generated when an unsuccessful (unnecessary) reselection attempt is performed during GPRS packet transfer mode (when NC0 or NC1 mode is applied for cell reselection). In this case, data transfer may be significantly degraded (depending on the frequency of "unnecessary" reselection attempts), a page can be lost, or the entire connection can be lost.

On the 2G side, the UE when camped on a CCCH is expected to read SI3/4 before reselection is possible. The information received in this SI (which may also be referred to as System Information) message contains information about the neighbor cell's location area. Thereby the UE can evaluate, before the cell change, whether the cell is listed on a list of forbidden location areas. If this is the case, the UE can prevent a cell change towards that cell.

In the situation of 2G-3G inter-working the same approach is not possible in most cases. The only currently specified solution for the UE is to attempt to perform cell re-selection as described above. This trial and error mechanism is not very efficient. The failure may continuously repeat even if the UE attempts multiple cell re-selections towards the same 3G cell.

In case of reselection towards a 3G cell, the UE needs to read the system information of the 3G cell in order to obtain the location area information of that cell. However in order to do this while there is an ongoing GPRS data transfer connection, the MS needs to interrupt the data transfer, which may cause the data throughput to be reduced.

It can be noted that a similar situation exists also on the 2G side when the UE or mobile station (MS) is camped on the PCCCH. In this case the UE receives the neighbor cell(s) parameters regarding cell reselection from the current serving cell's broadcast PSI3-series on the PBCCH. This means that the MS does not need to read the neighbor cell's SI3/4 information in order to obtain the parameters affecting cell reselection, so the MS will not know the LAI of the neighbor cell, thereby introducing the same situation as in 2G-3G interworking cell reselection.

SUMMARY

The foregoing and other problems are overcome, and other advantages are realized, in accordance with the exemplary embodiments of these teachings.

In accordance with an exemplary embodiment of the invention, a method includes receiving location area-related information, associating the location area-related information with a neighbor cell information to determine if a cell belongs to a forbidden location area, and avoiding selection of the cell if the cell is determined to belong to the forbidden location area.

In accordance with an exemplary embodiment of the invention, a method includes receiving an indication of a rejection of a selected cell in a location area having an associated frequency, adding the location area to a list of forbidden location areas, and inhibiting a reselection of at least one cell other than the selected cell having said associated frequency.

In accordance with an exemplary embodiment of the invention, a user equipment includes a transceiver for receiving location area-related information, a processor coupled to the transceiver, and a memory coupled to the processor for storing a set of instructions, executable by the processor, for associating the location area-related information with a neighbor cell information to determine if a cell belongs to a forbidden location area; and avoiding selection of the cell if the cell is determined to belong to the forbidden location area.

In accordance with an exemplary embodiment of the invention, a user equipment includes a transceiver for receiving an indication of a rejection of a selected cell in a location area having an associated frequency, a processor coupled to the transceiver, and a memory coupled to the processor for storing a set of instructions, executable by the processor, for adding the location area to a list of forbidden location areas, and inhibiting a selection of at least one cell other than the selected cell having said associated frequency.

In accordance with an exemplary embodiment of the invention, a network element includes a processor having an output for coupling to a transmitter, and a memory coupled to the processor for storing a set of instructions, executable by the processor, for transmitting broadcast system information comprising a location area-related information associating a location area with at least one cell in a neighbor cell list.

In accordance with another exemplary embodiment of the invention, system includes a network element including a processor coupled to a transmitter; and a memory coupled to the processor for storing a set of instructions, executable by the processor, for transmitting a location area-related information comprising an association between a location area and at least one cell in a neighbor cell list, and a user equipment including a transceiver for receiving the location area-related information, a processor coupled to the transceiver, and a memory coupled to the processor for storing a set of instructions, executable by the processor, for associating the location area-related information with a neighbor cell information to determine if a cell belongs to a forbidden location area and for avoiding selection of the cell if the cell is determined to belong to the forbidden location area.

In accordance with an exemplary embodiment of the invention, a signal bearing medium tangibly embodying a program of machine-readable instructions executable by a digital processing apparatus performs operations including receiving location area-related information, associating the location area-related information with a neighbor cell information to determine if a cell belongs to a forbidden location area, and avoiding selection of the cell if the cell is determined to belong to the forbidden location area.

In accordance with an exemplary embodiment of the invention, an integrated circuit includes a first circuitry having an input operable to receive location area-related information, and a second circuitry operable to associate the location area-related information with a neighbor cell information to determine if a cell belongs to a forbidden location area, and a third circuitry operable to avoid a selection of the cell if the cell is determined to belong to the forbidden location area.

In accordance with an exemplary embodiment of the invention, a method includes receiving at a user equipment an indication of a rejection of a selected cell in a location area and having an associated frequency, adding the location area to a list of forbidden location areas within the user equipment, and inhibiting for a period of time a reselection of at least one cell other than the selected cell having the associated frequency wherein the at least one cell is a highest ranked cell and is one of an intra-frequency cell and an inter-frequency cell and the at least one cell is listed in the list of forbidden location areas or belongs to a Public Land Mobile Network (PLMN) indicated as equivalent to a registered PLMN for the user equipment.

In accordance with an exemplary embodiment of the invention, a network element includes a transceiver coupled to a data processor coupled to a memory for storing computer program instructions, executable by the data processor, for compiling a SI2quater Rest Octet message, said message comprising a 3G_neighbor_Cell_LAI_Description element, and the transceiver broadcasts the message in its cell.

DETAILED DESCRIPTION

Figure 1A:
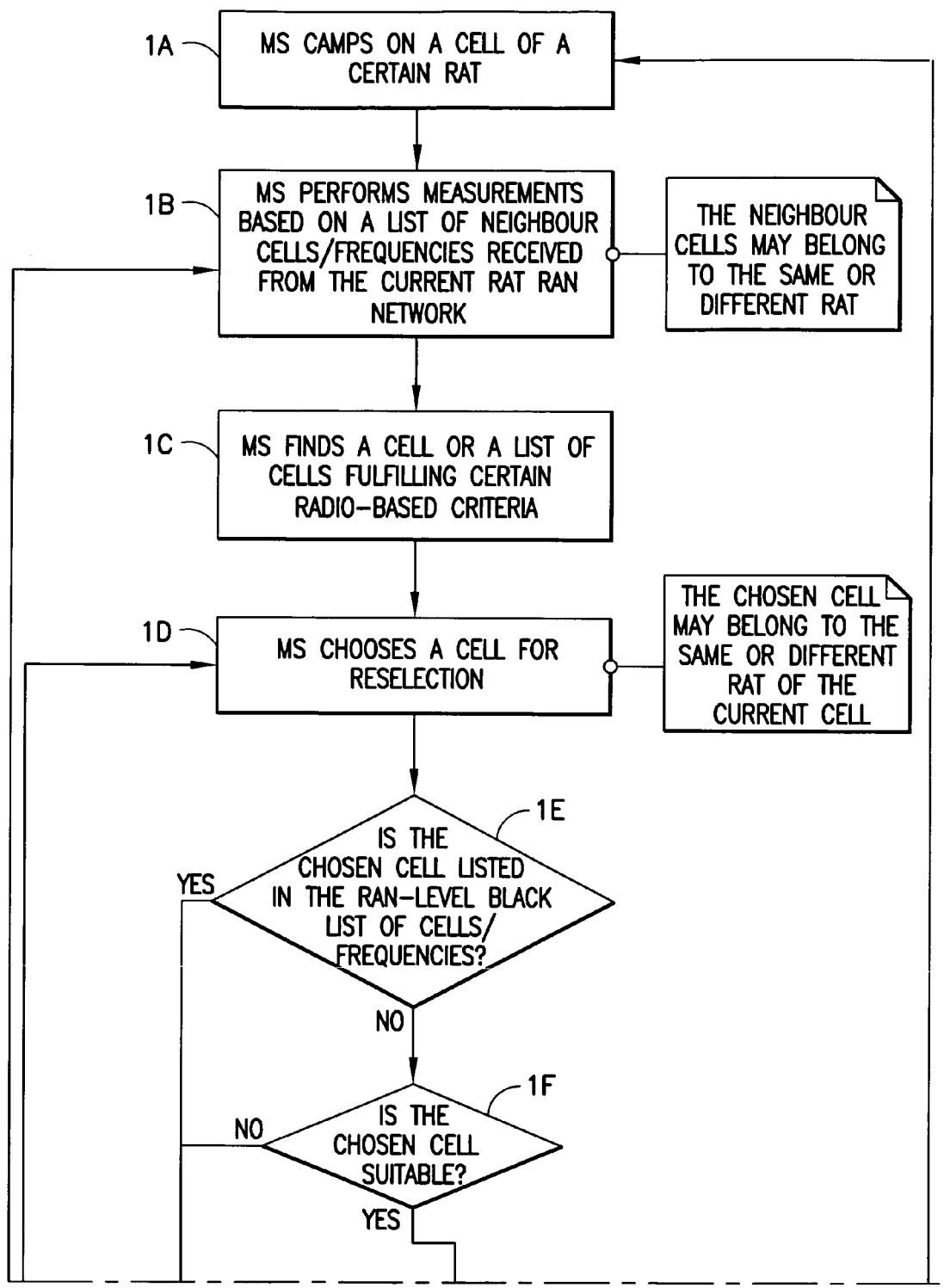
FIG. 1 is a logic flow diagram illustrating UE maintenance of a RAN-level black list and use of the black list information to prevent unnecessary cell reselections to (possibly) forbidden access cells according to an exemplary embodiment of the invention.

Exemplary embodiments of the invention relate generally to cellular mobility, but are applicable as well to non-cellular technologies. The exemplary embodiments of this invention improve mobility in the situation where a mobile device, also referred to as user equipment (UE), may perform reselection/cell change towards location areas in which it has no access. The invention is described using second and third generation (2G, 3G) inter-working as non-limiting examples, and is particularly advantageous for use in a UTRAN.

When the UE is camped on a cell of the registered Public Land Mobile Network (PLMN), it may perform cell re-selections to ensure that it is camped on the best cell according to network settings that are available in the serving PLMN.

If after cell re-selection a new cell is found to be part of different LA, based on the LAI, then the UE determines whether to perform a LR procedure to inform the network that it has moved to a new LA.

In accordance with an exemplary embodiment of this invention the UE is enabled to link the location area information with the neighbour cell information based on the neighbour list and broadcast information, thereby directly determining whether a certain cell belongs to a location area listed in the list of forbidden location areas.

A plurality of embodiments are provided for overcoming the problems discussed above, including: a plurality of network-assisted embodiments and at least one UE-only embodiment. The UE-only embodiment provides immediate improved operation as compared to current practice. The network-assisted embodiments provide a long-term flexible and efficient solution for overcoming the problems discussed above.

These embodiments of this invention can be realised by adding to broadcast system information certain information that links location areas to cells of the neighbour cell list. This can be accomplished either on the 2G side or the 3G side, as discussed in further detail below.

Several network-based exemplary embodiments of the invention are as follow. In an exemplary embodiment, additional information is added to the RAN system information broadcast message to provide the UE sufficient guidance to avoid the cells that belong to location areas that have already been forbidden for the UE. In this case, explicit LA and/or PLMN information is added for each cell on the 3G neighbour cell list received in the 2G RAN system information broadcast messages. Alternatively this information may be added in the 3G RAN system information broadcast messages, allowing the UE to make use of this additional information when coming back to the 2G cell and continuing operation there (note, in accordance with conventional practice the PLMN information is already provided on the 3G cell, the LA information is not).

Instead of broadcasting the full LA information in the RAN system information broadcast messages, in this embodiment the information is simplified to indicate whether a group of 3G cells belong to the same LA, such that if the UE is able to determine the actual LA of one cell in the group, it can then infer that the LA of the other 3G cells in the same group is the same.

In accordance with this further non-limiting embodiment, in the location update reject message the core network also sends a list of forbidden LAs to inform the UE. With this information, and the UE discovering the neighbour 3G cell's LA information (e.g., through the use of one of the above solutions or using existing procedures), the UE need not attempt location updates every time it enters a location area that is not yet listed in its list of "forbidden location areas for roaming".

In accordance with a UE-only exemplary embodiment of the invention, the UE stores the information it receives from its environment, and in this manner is able to avoid subsequent cell re-selections to the same cell or group of cells that have already been found to be part of a forbidden LA.

The UE-only embodiment can be implemented by, when the UE receives the Location Update Reject (LU Reject) with Reject Cause #15, in addition to listing the LAI in the list of "forbidden LAs for roaming" (also referred to herein as the forbidden LAI list) that is currently mandated by 3GPP TS 24.008, the UE inhibits subsequent reselection to all 3G cells belonging to the same frequency as the cell on which the UE received the LU Reject. This can be accomplished by storing a certain amount of cell information, the minimum being the cell's frequency and its LAI. The effect is to create a RAN-level "black list" of cells or frequencies that is used in conjunction with the forbidden LAI list such that the UE no longer attempts cell reselection towards any cell on that frequency as long as the LAI is forbidden.

In an exemplary and non-limiting embodiment, if the highest ranked cell is an intra-frequency or inter-frequency cell (such as defined in 3GPP TS 25.331) which is not suitable due to being part of the "list of forbidden LAs for roaming" or belonging to a PLMN which is not indicated as being equivalent to the registered PLMN, the UE shall not consider this cell and other cells on the same frequency, as candidates for reselection for a maximum of 300 s. If the highest ranked cell is an inter-RAT cell which is not suitable due to being part of the "list of forbidden LAs for roaming: or belonging to a PLMN which is not indicated as being equivalent to the registered PLMN, the UE shall not consider this cell as a candidate for reselection for a maximum of 300 s. As used herein, "registered PLMN" refers to the PLMN to which the UE is registered. Other PLMNs can be recognized by the UE as equivalent to the registered PLMN such as, for example, in accordance with a joint roaming agreement among PLMNs.

Figures 1, 1A, 1B:
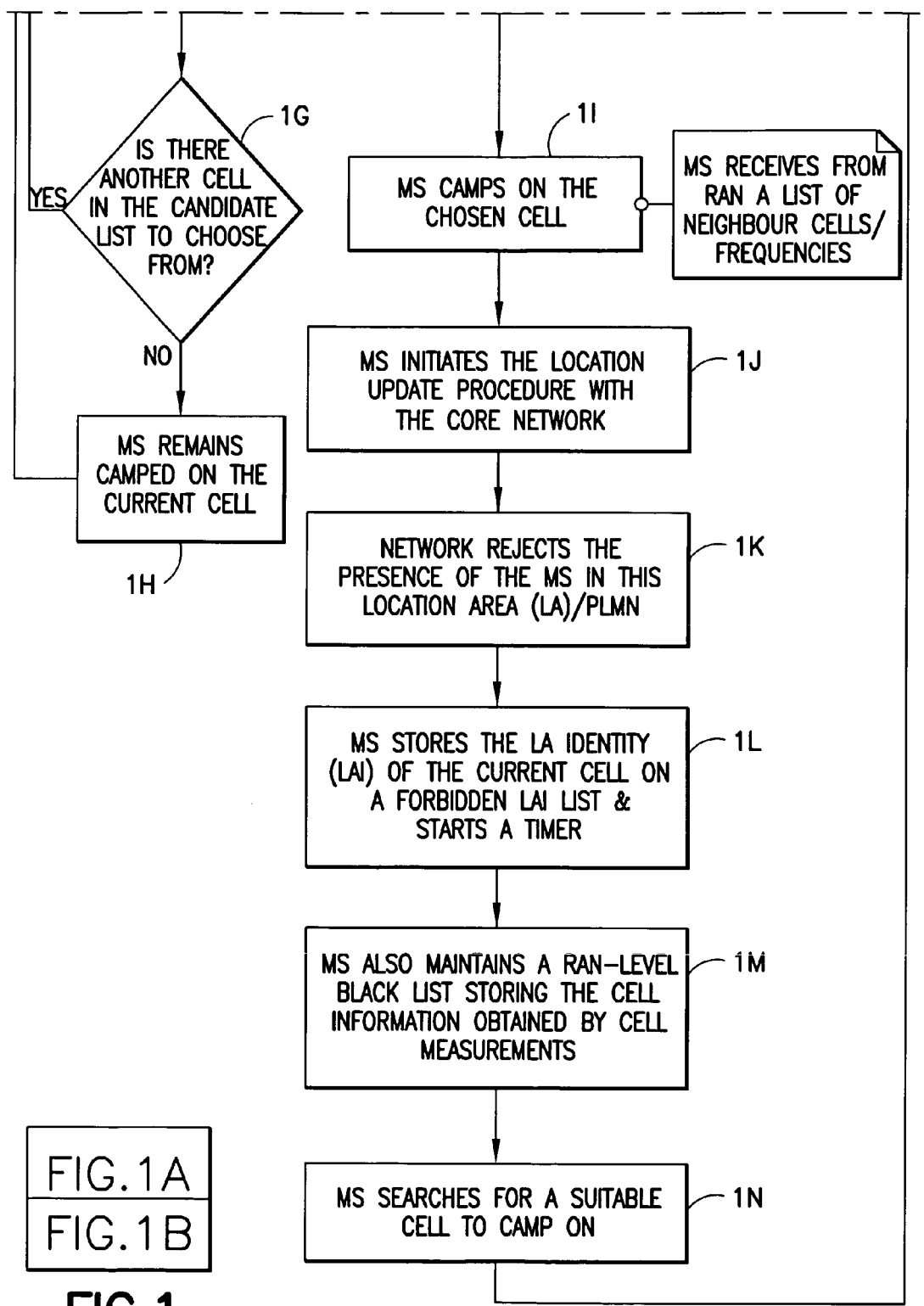

With reference to FIG. 1, there is illustrated a non-limiting and exemplary embodiment of a method for implementing the UE-only solution. Note that in the logic flow diagram of FIG. 1, as well as the logic flow diagram of FIG. 2, the UE is referred to as a mobile station (MS). As illustrated, at step 1A, the UE camps on a cell of a particular RAT. At step 1B, the UE performs measurements based on a list of neighbour cells/frequencies received from the current RAT RAN network. It is noted that neighbour cells may belong to the same or a different RAT and these measurements may be made from broadcast messages from the neighbour cells. At step 1C, the UE finds a cell or a list of cells fulfilling certain radio-based criteria such as, for example, those defined in 3GPP TS 45.008 and 3GPP TS 25.304. At step 1D, the UE chooses a cell for reselection. The chosen cell may belong to the same or a different RAT of the current cell.

After choosing a cell for reselection, at step 1E a determination is made whether or not the chosen cell is listed in the RAN-level black list of cells/frequencies, the formation of which is described more fully below. If the chosen cell is not so listed, a determination is made at step 1F as to the suitability of the chosen cell. If the chosen cell is deemed suitable, processing continues to step 1I. If the chosen cell is not deemed to be suitable, processing continues to step 1G. Likewise, if the chosen cell was determined to have been listed in the RAN-level black list of cells/frequencies at step 1E, processing continues to step 1G. Note that the use of "chosen cell" does not imply that the UE attempts to establish contact. Rather, the UE chooses the cell and evaluates the suitability of the cell prior to attempting to establish itself on the cell. As is evident by its use herein, the term "chosen cell" does not imply that the UE attempts to select or re-select the cell.

Rather, the UE chooses the cell and evaluates the suitability of the cell prior to attempting to camp on the cell.

At step 1G, a determination is made if there is another cell in the candidate list to choose from. If there is another available candidate, processing continues at step 1D. If there is another available candidate, processing continues at step 1H whereat the UE remains camped on the current cell and processing continues to step 1B.

At step 1I, the UE camps on the chosen cell and receives from the RAN a list of neighbor cells/frequencies. At step 1J, the UE initiates a location update procedure with the core network. At step 1K, the network rejects the presence of the UE in the LA/PLMN. At step 1L, the UE stores the LA identity (LAI) of the current cell on a forbidden LAI list in accordance, for example, with 3GPP TS 24.008 and starts a timer. At step 1M the UE maintains a RAN-level black list storing the cell information obtained by cell measurements. This cell information can include a) only the frequency of the current cell, b) the frequency and code of the current cell, c) the frequencies/cells in the RAN-provided neighbor list, and d) the RAT of the current cell. This information is associated with the LAI of the cell from which it is obtained. At step 1N the UE searches for a suitable cell to camp on and proceeds to step 1A. The suitable cell could be a cell belonging to a different RAT than the one the UE is currently on and have a different PLMN and/or a different LA.

The blocking time of the cells/frequencies can be defined in several ways. The following list provides examples of blocking time options:
1) Forever.
2) Until next successful cell reselection.
3) Until a new neighbour cell list has been received from RAN.
4) According to current definition of the lifetime of the forbidden LAI list. This means that all cells on the frequency are barred for as long as the LAI is listed on the forbidden LAI list. Rules on how this list is handled (including when to clear it) are currently specified in 3G TS 24.008.
5) Until the next successful Location Update in LA with same LAI as listed in the forbidden LAI list.
6) Until the next successful Location Update in any LAI in any RAN system.
7) Until the next successful Location Update in the RAN system equal to the RAN system of the/a LAI in the forbidden LAI list.

When the blocking time is exceeded, the list of neighbour cells/frequencies is deleted.

Figure 2:
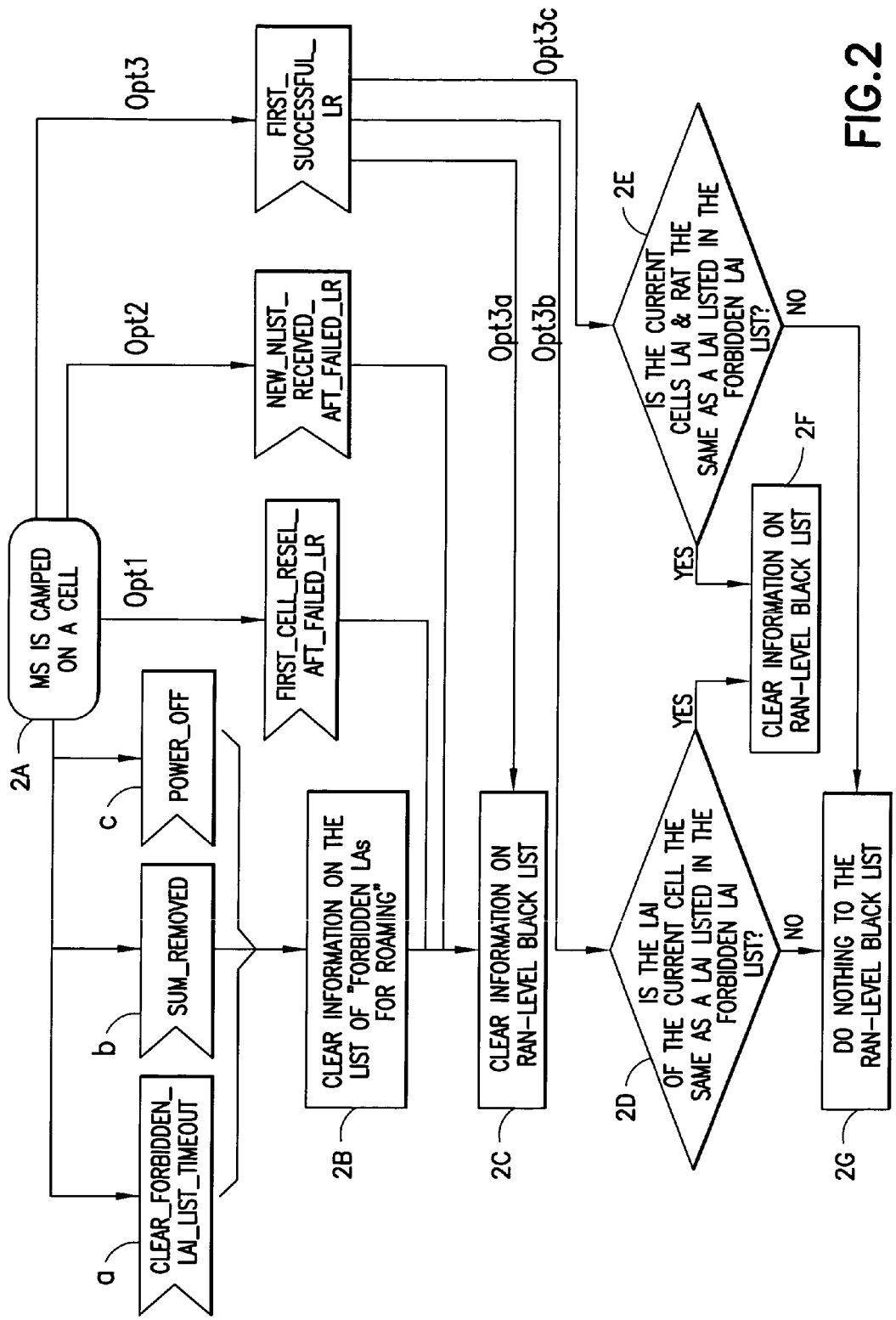
FIG. 2 is a logic flow diagram illustrating a technique for the UE to clear the RAN-level black list according to an exemplary embodiment of the invention.

With reference to FIG. 2, there is illustrated a method for the UE to clear the RAN-level black list according to an exemplary and non-limiting embodiment of the invention. As illustrated, at step 2A, the UE is camped on a cell. If any of the three triggers (a,b,c), corresponding to a timeout of the clear forbidden LAI list parameter, the removal of the subscriber identity module (SIM), or a power off situation, processing proceeds to step 2B where the information on the forbidden LAI list is cleared. Processing then continues to step 2C where the RAN-level black list is cleared.

If, in accordance with option 1 (opt1), there is encountered a first cell reselection after the failure of a location registration (FIRST_CELL_RESEL_AFT_FAILED_LR) condition, processing likewise proceeds to step 2C. If, in accordance with option 2 (opt2), the UE receives a new neighbour list after a failed registration attempt (NEW_NLIST_RECEIVED_AFT_FAILED_LR), processing likewise proceeds to step 2C. If, in accordance with option 3a (opt3a), there is encountered a first successful location registration (FIRST_SUCCESSFUL_LR) condition, processing likewise proceeds to step 2C.

In accordance with option 3b (opt3b), there is encountered a FIRST_SUCCESSFUL_LR condition, processing likewise proceeds to step 2D. At step 2D, if the LAI of the current cell is the same as a LAI listed in the forbidden LAI list, processing continues to step 2F and the RAN-level black list is cleared. Alternatively, if the LAI of the current cell is not the same as a LAI listed in the forbidden LAI list, processing continues to step 2G and nothing further is done to the RAN-level black list.

In accordance with option 3c (opt3c), there is encountered a FIRST_SUCCESSFUL_LR condition, processing likewise proceeds to step 2E. At step 2E, if the current cell's LAI and RAT are the same as a LAI listed in the forbidden LAI list, processing continues to step 2F and the RAN-level black list is cleared. Alternatively, if the current cell's LAI and RAT are not the same as a LAI listed in the forbidden LAI list, processing continues to step 2G and nothing further is done to the RAN-level black list.

The usage of the RAN-level black list can be applied in various ways. One technique bars all 3G cells belonging to the 3G neighbour cell list, when the UE receives a LU Reject with reject cause #15. The same technique, applied in a less aggressive manner, has the UE only bar the cell on which the LU reject with reject cause #15 was received.

The blocking according to the foregoing description is preferably applied primarily for UE-based autonomous cell reselection, and would not, for example, prevent handover to the barred frequency.

In the exemplary embodiments of UE-based optimization described above, the UE stores or memorizes the information it receives from its environment, and thus is enabled to avoid subsequent cell re-selections to the same cell or group of cells that have been discovered to be part of a forbidden LA or PLMN (or which may be assumed to be part of the same LA). The UE may memorize the frequency and/or other properties, such as the scrambling code, that can be used to again identify the cell that has previously rejected a LR attempt.

The following example shows how the network-assisted solution for LA Grouping according to an exemplary embodiment of the invention can be implemented using only simplified LA information on the 3G RAN system information broadcast message. This exemplary embodiment can also be used with some modifications to the message fields if it is determined to be more beneficial to include the full LA information.

The System Information Block type 18 contains PLMN identities of neighboring cells to be considered in idle mode as well as in the connected mode. The information elements (IEs) shown in bold and underlined are added in accordance with an exemplary embodiment of the invention.

| Information Element/Group name | Need | Multi | Type and reference | Semantics description |
|---|---|---|---|---|
| Idle mode PLMN identities | OP | | PLMN identities of neighbour cells 10.3.7.53a | |
| Connected mode PLMN identities | OP | | PLMN identities of neighbour cells 10.3.7.53a | |
| Idle mode LA grouping | OP | | LA grouping of neighbour cells X.X.X | |
| Connected mode LA grouping | OP | | LA grouping of neighbour cells X.X.X | |

This IE shown above contains the LA groupings of neighbour cells, and may be formulated as follows:

| Information Element/Group name | Need | Multi | Type and reference | Semantics description |
|---|---|---|---|---|
| LA groups for intra-frequency cells list | OP | | Boolean | TRUE indicates this field is present |
| >Number of LA groups | MD | 0 to <maxCellLAGroup> | | Indicates the number of LA groups that are different from the serving cell's LA that are applicable for this list of cells |
| >LA group | OP | | Integer(0 .. <maxCellLAGroup>-1) | |
| >>Intra-frequency cell id | MD | | Integer(0 .. <maxCellMeas>-1) | |
| >Same LA as serving cell | OP | | Boolean | TRUE indicates this field is present |
| >>Intra-frequency cell id | MD | | Integer(0 .. <maxCellMeas>-1) | |
| LA groups for inter-frequency cells list | OP | | Boolean | TRUE indicates this field is present |
| >Number of LA groups | MD | 0 to <maxCellLAGroup> | | Indicates the number of LA groups that are different from the serving cell's LA that are applicable for this list of cells |
| >LA group | OP | | Integer(0 .. <maxCellLAGroup>-1) | |
| >>Inter-frequency cell id | MD | | Integer(0 .. <maxCellMeas>-1) | |
| >Same LA as serving cell | OP | | Boolean | TRUE indicates this field is present |
| >>Intra-frequency cell id | MD | | Integer(0 .. <maxCellMeas>-1) | |

With regard to the foregoing two Tables, it is noted that the field "maxCellMeas" is defined in 3GPP TS 25.331, and that each "LA group" field denotes a LA that is different from the serving cell's, under which a list of cell IDs is given. In the above coding, the "LA group" field is simply a number confined by the range stipulated. It could also be replaced by the actual Local Area Identity (LAI) information. If the actual LAI information is needed, the UE need only obtain the LAI information from one of the cells listed under the same "LA group" field.

For the embodiment where the needed information is to be broadcast on the 2G RAN system information broadcast message, the implementation may broadcast the LA and possibly the PLMN information of each 3G neighbour cell in a newly defined system information message type, or alternatively new fields may be added to an existing message type, such as System Information Type 2quater.

The following non-limiting example shows how the system information coding may be implemented when adding new fields to an existing system information message type. As before, the information elements (IEs) shown in bold and underlined are added in accordance with an exemplary embodiment of the invention:

TABLE 10.5.2.33b.1

SI2quater Rest Octets information element

```
< SI2quater Rest Octets > ::=
     < BA_IND : bit (1) >
     < 3G_BA_IND : bit (1) >
     < MP_CHANGE_MARK : bit (1) >
     < SI2quater_INDEX : bit (4) >
     < SI2quater_COUNT : bit (4) >
     { 0 | 1 < Measurement_Parameters Description : < Measurement Parameters
Description struct >> }
     { 0 | 1 < GPRS_Real Time Difference Description : < GPRS_Real Time Difference
Description struct >> }
     { 0 | 1 < GPRS_BSIC Description : GPRS_BSIC Description struct > }
     { 0 | 1 < GPRS_REPORT PRIORITY Description : <
GPRS_REPORT_PRIORITY Description struct >> }
     { 0 | 1 < GPRS_MEASUREMENT_Parameters Description :
          < GPRS_MEASUREMENT Parameters Description struct >> }
     { 0 | 1 < NC Measurement Parameters : < NC Measurement Parameters struct >> }
     { 0 | 1 < extension length : bit (8) >
          < < bit (val(extension length)+1) > &
          { < SI2q Extension Information > ! { Ignore: bit ** = <no string> } } >
}
     { 0 | 1 < 3G Neighbour Cell Description : < 3G Neighbour Cell Description struct
>> }
     { 0 | 1 < 3G Measurement Parameters Description : < 3G Measurement
Parameters Description struct >> }
     { 0 | 1 < GPRS_3G_MEASUREMENT Parameters Description :
          < GPRS_3G MEASUREMENT Parameters Description struct >> }
     { null | L
                              -- Receiver compatible with earlier release
          | H
                              -- Additions in release R5:
          { 0 | 1 < 3G Additional Measurement Parameters Description :
               < 3G Additional Measurement Parameters Description
struct >> }
          { 0 | 1 < 3G ADDITIONAL MEASUREMENT Parameters Description 2
:
               < 3G ADDITIONAL MEASUREMENT Parameters
Description 2 struct >> }
     { null | L
                              -- Receiver compatible with earlier release
          | H
                              -- Additions in release R6°:
          < 3G_CCN_ACTIVE : bit (1) >
          { 0 | 1 < 3G Neighbour Cell LAI Description : { 1< 3G Neighbour
Cell LAI Description struct >> ** 0 }
} }
< spare padding >;
< 3G Neighbour Cell LAI Description struct> ::=
     < LAI ID 3G : bit (x) >
     < Number of 3G Neighbour Cells : bit (y)
     { 0
          0 | 1 { 3G Neighbour Cell Index : bit } *
(val(Number of 3G Neighbour Cells)) }
     { 1
          0 | 1 { 3G neighbour cell bitmap : bit } *
(val(Number of 3G Neighbour Cells)) } ;
```

Here the LAI_ID_3G field could indicate both the full LAI of the neighbours belonging to the LAI, or it could indicate a simplified LAI.

The field 'Number_of_3G_Neighbour_Cells' is used to indicate how many neighbours belong to the LAI identified by LAI_ID_3G, and is also used for indicating the length of '3G_Neighbour_Cell_Index' or '3G_Neighbour_Cell_bitmap' fields.

This exemplary embodiment may be used when implementing two of the network-assisted embodiments: "LA broadcast solution" and "LA grouping solution".

It is preferred that consideration be made of the criteria for removing a cell from the list of non-suitable cells, such as in border areas where the other PLMNs in the neighbouring regions may use the same radio frequency.

The network based exemplary embodiments are designed to avoid causing problems for legacy UEs that still need to understand the current system information. Rather than using a completely new neighbour list encoding, it may be preferred to broadcast a separate list of the LAs of different cells on the neighbour list. This may be optimally done by sending the neighbour list as it is currently encoded, and then an addition to the list using the same indexes to identify the LA of each cell or group of cells in the neighbour list. This additional information can be included in the same System Information message, if there is enough capacity in the message. If not, then a new message may be introduced.

The UE based RAN-level black list can be implemented by the UE without system standards, with consideration being made to the black list deletion criteria in order to not lose any possibly valid candidate(s) 3G cell for re-selection.

Figure 3:
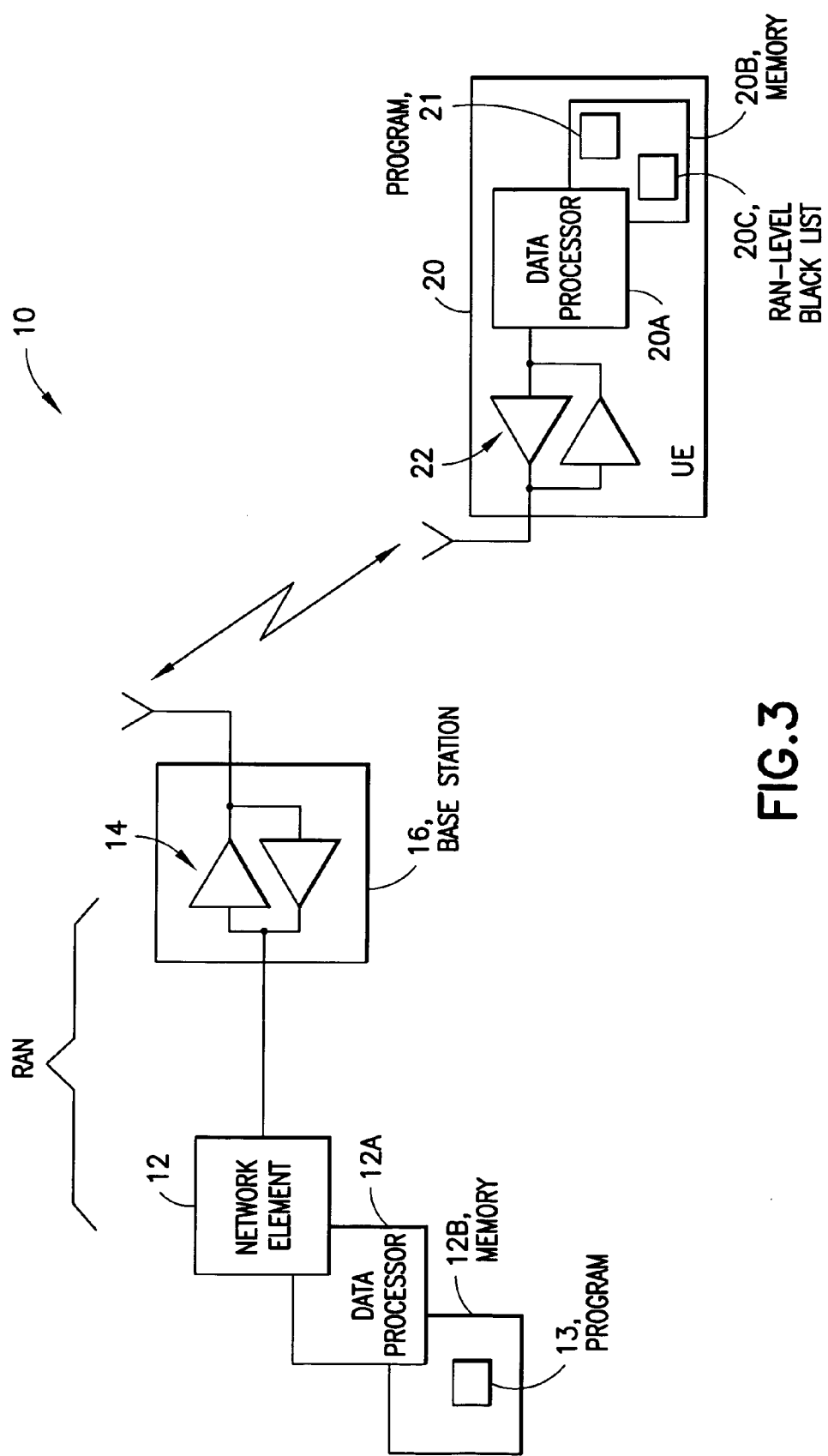
FIG. 3 is a block diagram of apparatus suitable for implementing exemplary and non-limiting embodiments of the invention.

FIG. 3 is a block diagram of apparatus suitable for implementing exemplary embodiments of the invention. A wireless communication system 10 includes a RAN embodied in at least one network element 12 that is coupled to a transceiver 14, such as a base station 16, for bidirectional communication with a UE 20 having a transceiver 22. The network element 12 is assumed to include or be coupled to a data processor 12A that in turn includes or is coupled to a memory 12B. The memory 12B stores data and operating programs, including one or more programs 13 the execution of which implements the network-assisted embodiments of this invention. The UE 20 is also assumed to include or be coupled to a data processor 20A that in turn includes or is coupled to a memory 20B. The memory 20B stores data and operating programs, including one or more programs 21 the execution of which implements the UE-based embodiment(s) of this invention. Note in this case the memory 20B may also store the RAN-level black list 20C, as discussed above. In the network-assisted embodiments the memory 20B may also store the list of forbidden location areas for roaming. The program 21 enables the UE 20 to implement the logic flow diagrams of FIGS. 1 and 2 for the UE-based embodiment, and/or to respond to the network-originated messages discussed above if operating in accordance with the network-assisted embodiments. Note that the LA and their access restrictions can be governed by the CN of the wireless system, and the SI(B) and their distribution can be governed by the RAN. Note further in this regard that CN-related SI may be received by the RAN from the CN entity of the network, and mapped to a broadcast channel by the RAN. While illustrated in the exemplary embodiment above as distinct elements, in alternative exemplary and non-limiting embodiments of the invention the functionality of the network element 12 and base station 16 can be combined into a single element.

In general, the various embodiments of the UE 20 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

As was noted, certain of the embodiments of this invention may be implemented by computer software executable by the data processor 12A of the network element 12, and/or by the data processor 20A of the UE 20, and/or by dedicated hardware, or by a combination of software and hardware. Further in this regard it should be noted that the various blocks of the logic flow diagrams of FIGS. 1 and 2 may represent program steps, or interconnected logic circuits, blocks and functions, or a combination of program steps and logic circuits, blocks and functions.

The memories 12B and 20B may be of any type suitable to the local technical environment and may be implemented using any suitable data storage technology, such as semiconductor-based memory devices, magnetic memory devices and systems, optical memory devices and systems, fixed memory and removable memory. The data processors 12A and 20A may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Figure 4:
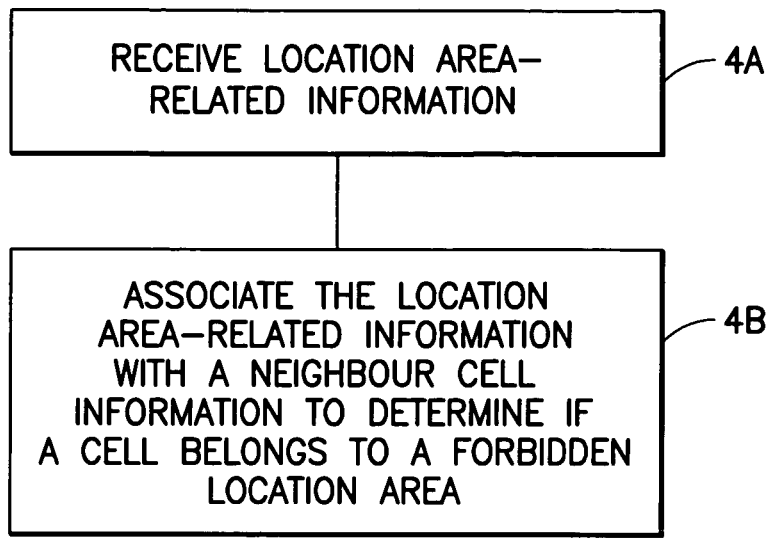
FIG. 4 is a flow chart of a method according to an exemplary embodiment of the invention.

Based on the foregoing discussion it can be appreciated that in one non-limiting aspect thereof the invention provides apparatus, method and a computer program product for enabling a wireless network to transmit location area-related information to the UE 20 so that the UE 20 can associate the location area-related information with neighbour cell information for determining whether a certain cell belongs to a forbidden location area. With reference to FIG. 4, there is illustrated a flow chart of a method according to an exemplary embodiment of the invention. At step 4A, the UE 20 receives location area-related information. At step 4B, the UE 20 associates the received location area-related information with neighbour cell information and determines whether a certain cell belongs to a forbidden location area. The wireless network may use broadcast system information to transmit information that links location areas to cells of a neighbour cell list by, in one non-limiting embodiment, adding additional information to RAN system information broadcast messages, such as explicit LA and/or PLMN information, for each cell in a 3G neighbour cell list received in a 2G RAN system information broadcast message, or by including the information in a 3G RAN system information broadcast message, thereby allowing the UE 20 to make use of this additional information when coming back to the 2G cell and continuing operation there.

Figure 5:
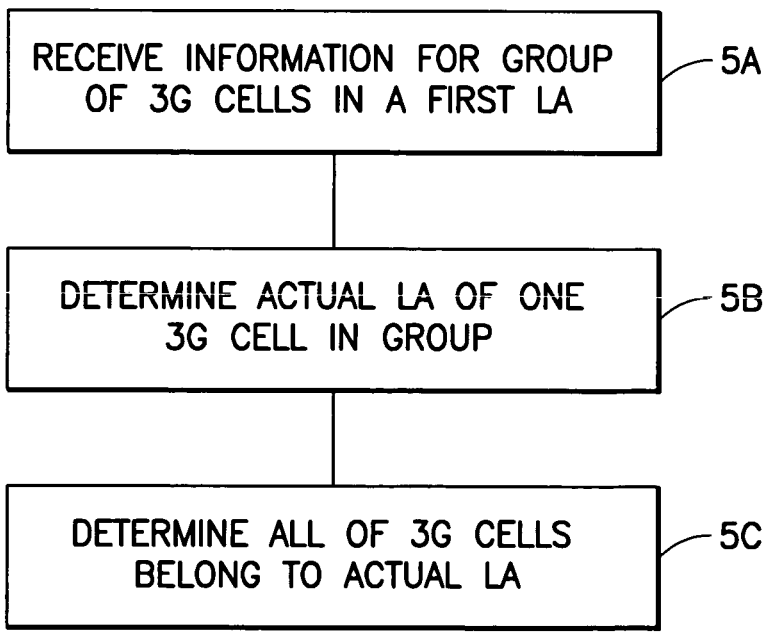
FIG. 5 is a flow chart of a method according to an exemplary embodiment of the invention.

With reference to FIG. 5, there is illustrated a method according to an alternative exemplary embodiment of the invention. At Step 5A, the wireless network may indicate whether a group of 3G cells belong to the same LA. Then, at step 5B, if the UE 20 is able to determine the actual LA of one cell in the group, it may then, at step 5C, infer or determine that the LA of other 3G cells in the same group is the same. Alternatively, the wireless network may use a location update reject message to send the UE 20 a list of forbidden LAs, such that the UE 20 need not attempt location updates when it enters a location area that is not yet listed in a UE 20 list of forbidden location areas for roaming.

Figure 6:
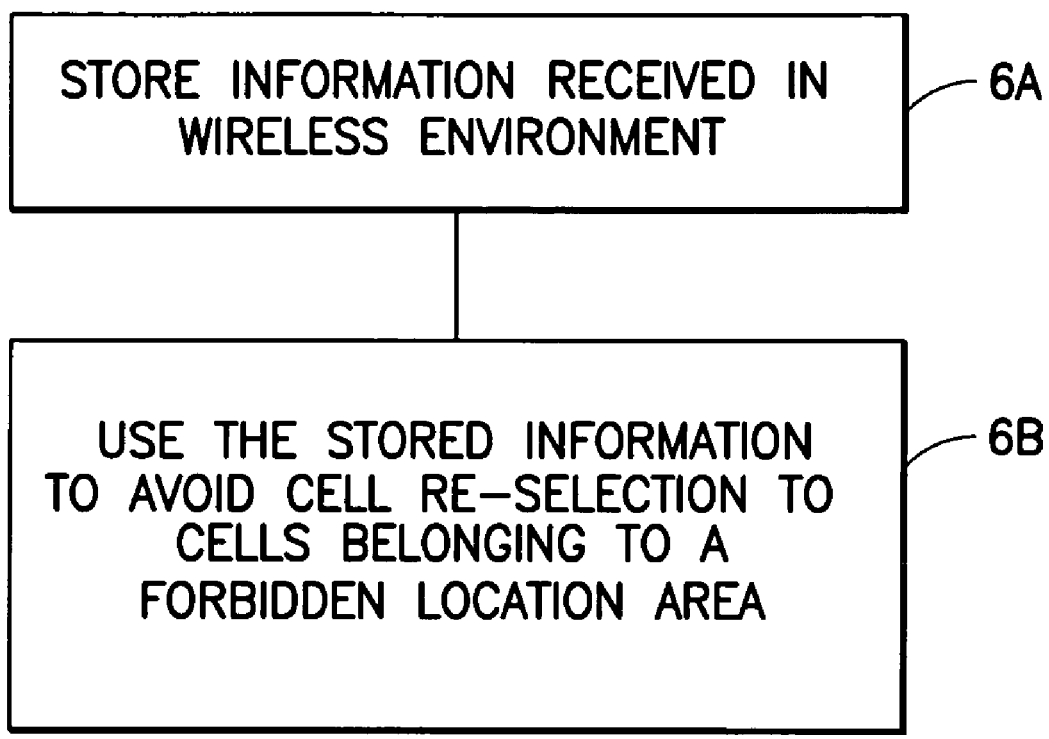
FIG. 6 is a flow chart of a method according to an exemplary embodiment of the invention.

Based on the foregoing discussion it can be further appreciated that in another non-limiting aspect thereof the invention provides apparatus, method and a computer program product for enabling a UE 20 to store information that it receives from its environment to avoid subsequent cell reselections to a same cell or group of cells that have been determined to be part of a forbidden LA. With reference to FIG. 6, there is illustrated a method according to an exemplary embodiment of the invention. At step 6A, the UE 20 store information that it receives from its environment. At step 6B, the UE 20 uses the stored information to avoid subsequent cell re-selections to a same cell or group of cells that have been determined to be part of a forbidden LA. In this exemplary embodiment the UE 20 receives a Location Update Reject (LU Reject), with Reject Cause #15, and in addition to listing the LAI in a list of "forbidden LAs for roaming", further inhibits subsequent reselection to all 3G cells belonging to the same frequency as the cell on which the UE 20 received the LU Reject, thereby creating a RAN-level black list of cells or frequencies for use in conjunction with the forbidden LAI list to avoid cell reselection towards any cell on that frequency so long as the LAI is forbidden. The UE 20 is also operable to selectively remove information from the RAN-level black list.

Various modifications and adaptations may become apparent to those skilled in the relevant arts in view of the foregoing description, when read in conjunction with the accompanying drawings. As but some examples, the use of other similar or equivalent message types, message formats and IE formats and constituent information may be attempted by those skilled in the art.

Further, the exemplary embodiments of the invention may be used to advantage to solve the problems that arise in the 2G system case as discussed above, for example when the serving cell is using PBCCH/PCCCH and the mobile station is GPRS attached, as the mobile station would not need to check SI3/4 from the target cell.

However, all such and similar modifications of the teachings of this invention will still fall within the scope of the non-limiting embodiments of this invention.

Further, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   receiving, at an apparatus from a serving cell, location area-related information associated with neighbor cell information regarding a neighbor cell in a neighbor cell list;
   determining from the received location area-related information associated with the neighbor cell information if a candidate cell belongs to a forbidden location area; and
   avoiding selection of said candidate cell by the apparatus if said candidate cell is determined to belong to said forbidden location area,
   wherein receiving comprises receiving at the apparatus a location update rejection message comprising a list of forbidden location areas (LAs); in which the apparatus comprises a user equipment.

2. The method of claim 1 wherein said location area-related information associated with the neighbor cell information comprises an association between a location area and at least one other cell in a neighbor cell list.

3. The method of claim 1 wherein said location area-related information associated with the neighbor cell information comprises a Radio Access Network (RAN) system information broadcast message and at least one of location area (LA) information and Public Land Mobile Network (PLMN) information.

4. The method of claim 1 wherein said location area-related information associated with the neighbor cell information comprises a Radio Access Network (RAN) system information broadcast message and information for each of a plurality of cells in a 3G neighbor cell list.

5. A method comprising:
   receiving, at an apparatus, an indication of a rejection of a selected cell in a location area and having an associated frequency;
   adding said location area to a list of forbidden location areas which is stored within the apparatus; and
   inhibiting thereafter a selection by the apparatus of at least one cell other than said selected cell having said associated frequency.

6. The method of claim 5 wherein inhibiting comprises inhibiting said selection of said at least one cell for a predetermined period of time if said at least one cell is one of an intra-frequency cell and an inter-frequency cell and said at least one cell belongs to a forbidden location area.

7. The method of claim 6 wherein said period of time is not more than 300 seconds.

8. The method of claim 5 further comprising creating and storing a RAN-level blacklist within the apparatus comprising the at least one cell and the associated frequency corresponding to said location area in said list of forbidden location areas.

9. The method of claim 6 further comprising selectively removing the at least one cell and associated frequency from said stored RAN-level blacklist.

10. An apparatus comprising at least one processor; and at least one memory including computer program code, the at least one memory and the computer program code configured to, with the at least one processor, cause the apparatus to perform at least the following:
    to receive, from a serving cell, location area-related information associated with a neighbor cell information regarding a neighbor cell in a neighbor cell list;
    to associate said location area-related information with the neighbor cell information to determine from the received location area-related information associated with the neighbor cell information if a candidate cell belongs to a forbidden location area; and
    to avoid selecting said candidate cell if said candidate cell is determined to belong to said forbidden location area,
    wherein said location area-related information associated with the neighbor cell information comprises a list of forbidden location areas received in a location update rejection message; in which the apparatus comprises a user equipment.

11. The apparatus of claim 10 wherein said location area-related information associated with the neighbor cell information comprises an association between a location area and at least one other cell in a neighbor cell list.

12. The apparatus of claim 10 wherein said location area-related information associated with the neighbor cell information comprises a 3G_neighbor_Cell_LAI_Description element comprising a LAI_ID__3G field which indicates a 3G location area identifier.

13. The apparatus of claim 10 wherein said location area-related information associated with the neighbor cell information comprises a Radio Access Network (RAN) system information broadcast message and at least one of location area (LA) information and Public Land Mobile Network (PLMN) information.

14. The apparatus of claim 10 wherein said location area-related information associated with the neighbor cell information comprises a Radio Access Network (RAN) system information broadcast message and information for each of a plurality of cells in a 3G neighbor cell list.

15. An apparatus comprising at least one processor; and at least one memory including computer program code, the at least one memory and the computer program code configured to, with the at least one processor, cause the apparatus to perform at least the following:
to receive an indication of a rejection of a selected cell in a location area and having an associated frequency;
to add said location area to a list of forbidden location areas; and
to inhibit a selection of at least one cell other than said selected cell having said associated frequency.

16. The apparatus of claim 15 where the at least one memory and the computer program code are further configured to cause the apparatus to create and to store in the memory a radio access network level blacklist comprising the at least one cell and said associated frequency corresponding to said location area in said list of forbidden location areas.

17. The apparatus of claim 16 where the at least one memory and the computer program code are further configured to cause the apparatus to remove the at least one cell and the associated frequency from said stored RAN-level blacklist;
in which the apparatus comprises a user equipment.

18. An apparatus comprising at least one processor; and at least one memory including computer program code, the at least one memory and the computer program code configured to, with the at least one processor, cause the apparatus to perform at least the following:
to transmit in a serving cell broadcast system information comprising a location area-related information associating a location area with at least one cell in a neighbor cell list.

19. The apparatus of claim 18 wherein said broadcast system information comprises a Radio Access Network (RAN) system information broadcast message and at least one of location area (LA) information and Public Land Mobile Network (PLMN) information.

20. The apparatus of claim 18 wherein said broadcast system information comprises a Radio Access Network (RAN) system information broadcast message and information for each of a plurality of cells in a 3G neighbor cell list;
in which the apparatus comprises a network element.

21. A system comprising:
a network element comprising:
a processor; and
a memory storing a set of instructions, executable by the processor, for transmitting a location area-related information comprising an association between a location area and at least one cell in a neighbor cell list; and
a user equipment comprising:
a receiver configured to receive, from the network element, the location area-related information;
a processor; and
a memory storing a set of instructions, executable by the processor, for determining from the received location area-related information if a candidate cell belongs to a forbidden location area, and for avoiding selection of said candidate cell by said user equipment if said candidate cell is determined to belong to said forbidden location area.

22. A computer readable memory tangibly embodying a program of machine-readable instructions executable by a digital processing apparatus to perform operations comprising:
receiving, from a serving cell, location area-related information associated with a neighbor cell information regarding a neighbor cell in a neighbor cell list;
determining from the received location area-related information associated with the neighbor cell information if a candidate cell belongs to a forbidden location area; and
avoiding selection of said candidate cell if said candidate cell is determined to belong to said forbidden location area.

23. The computer readable memory of claim 22 wherein said location area-related information associated with the neighbor cell information comprises an association between a location area and at least one other cell in a neighbor cell list.

24. The computer readable memory of claim 22 wherein said location area-related information associated with the neighbor cell information comprises a Radio Access Network (RAN) system information broadcast message and at least one of location area (LA) information and Public Land Mobile Network (PLMN) information.

25. The computer readable memory of claim 22 wherein said location area-related information associated with the neighbor cell information comprises a Radio Access Network (RAN) system information broadcast message and information for each of a plurality of cells in a 3G neighbor cell list.

26. The computer readable memory of claim 22 wherein receiving the location area-related information associated with the neighbor cell information comprises receiving a location update rejection message comprising a list of forbidden location areas (LAs).

27. An integrated circuit comprising:
a first circuitry having an input operable to wirelessly receive, from a serving cell, location area-related information associated with a neighbor cell information regarding a neighbor cell in a neighbor cell list; and
a second circuitry operable to determine, using at least the location area-related information, if a candidate cell belongs to a forbidden location area; and
a third circuitry operable to avoid a selection of said candidate cell if said candidate cell is determined to belong to said forbidden location area.

28. A method comprising:
receiving, at a user equipment, an indication of a rejection of a selected cell in a location area and having an associated frequency;
adding said location area to a list of forbidden location areas stored within the user equipment; and
inhibiting for a period of time a reselection by the user equipment of at least one cell other than said selected cell having said associated frequency, wherein said at least one cell is a highest ranked cell and is one of an intra-frequency cell and an inter-frequency cell and said at least one cell is listed in said list of forbidden location areas or belongs to a Public Land Mobile Network (PLMN) indicated as equivalent to a registered PLMN for said user equipment.

29. The method of claim 28 wherein said period of time is about 300 seconds.

* * * * *